United States Patent [19]

Allen

[11] Patent Number: 5,571,399
[45] Date of Patent: Nov. 5, 1996

[54] ELECTROSTATIC FLUID FILTER AND SYSTEM

[76] Inventor: Robert H. Allen, 270 Willow Wood St., Plano, Tex. 75094

[21] Appl. No.: 370,305

[22] Filed: Jan. 9, 1995

[51] Int. Cl.$^6$ .............................. B01D 35/06; B03C 5/02
[52] U.S. Cl. ............................................ 204/665; 204/672
[58] Field of Search .................................... 204/302, 304, 204/305, 306, 307, 308, 665, 672, 562, 572

[56] References Cited

U.S. PATENT DOCUMENTS

| | | | |
|---|---|---|---|
| 4,372,837 | 2/1983 | Watson et al. | 204/186 |
| 4,594,138 | 6/1986 | Thompson | 204/302 |
| 4,609,458 | 9/1986 | Okamura et al. | 210/85 |
| 4,800,011 | 1/1989 | Abbott et al. | 204/302 |
| 5,332,485 | 7/1994 | Thompson | 204/302 |
| 5,352,347 | 10/1994 | Reichert | 204/302 |

*Primary Examiner*—John Niebling
*Assistant Examiner*—William T. Leader
*Attorney, Agent, or Firm*—John E. Vandigriff

[57] ABSTRACT

The invention is to an electrostatic fluid filter that includes a housing, a removable array of filter elements and alternately electrically charged plates positioned parallel to the fluid flow. The charged plates are mounted between spacers each of which includes a mesh made of an insulating material and further includes a plurality of parallel guide tracks positioned on the mesh for holding the charge plates, and where each guide track is adjacent to a conductive strip which is in electrical contact with the plate in that guide track so that the plates are in electrical contact with alternately either a positive or negative electrical terminal.

10 Claims, 7 Drawing Sheets

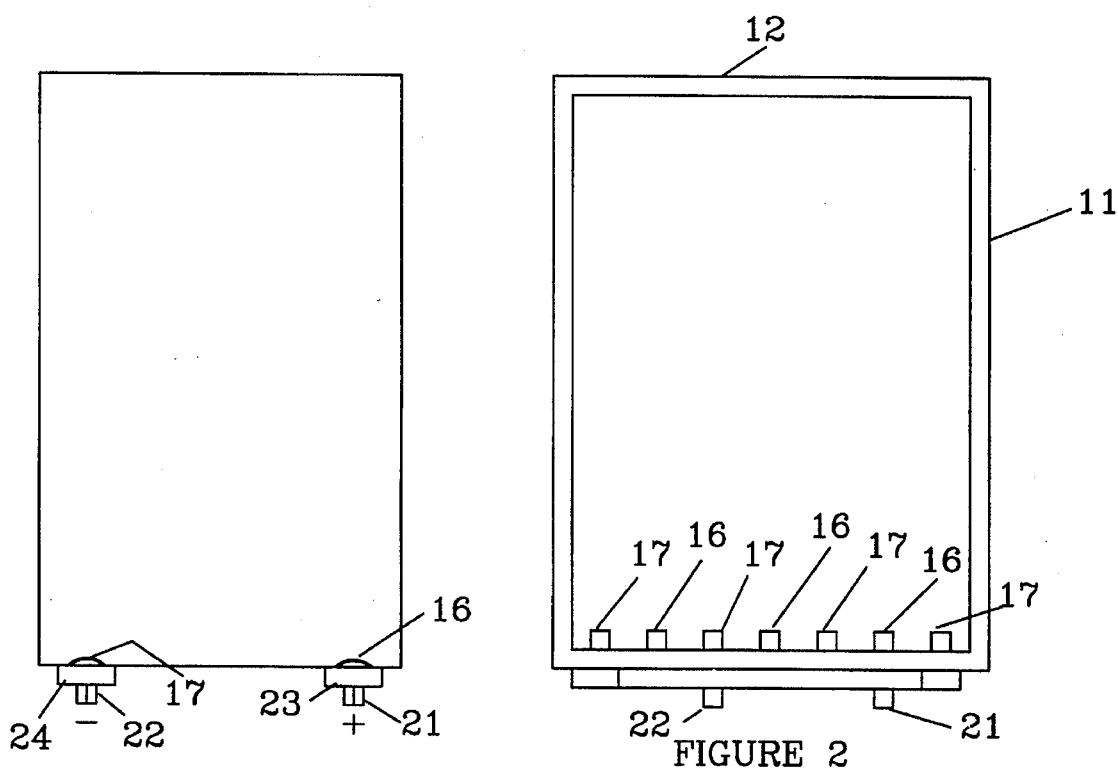
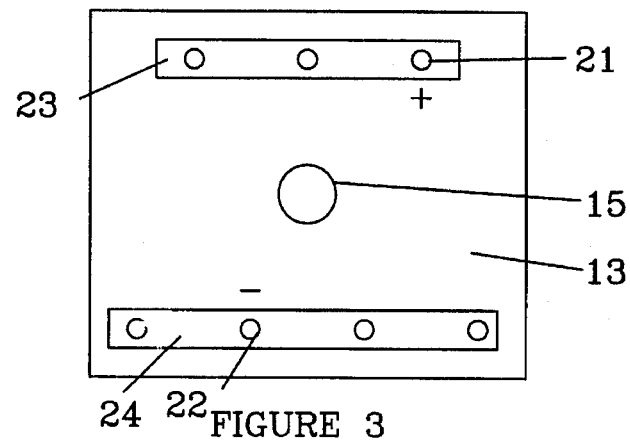

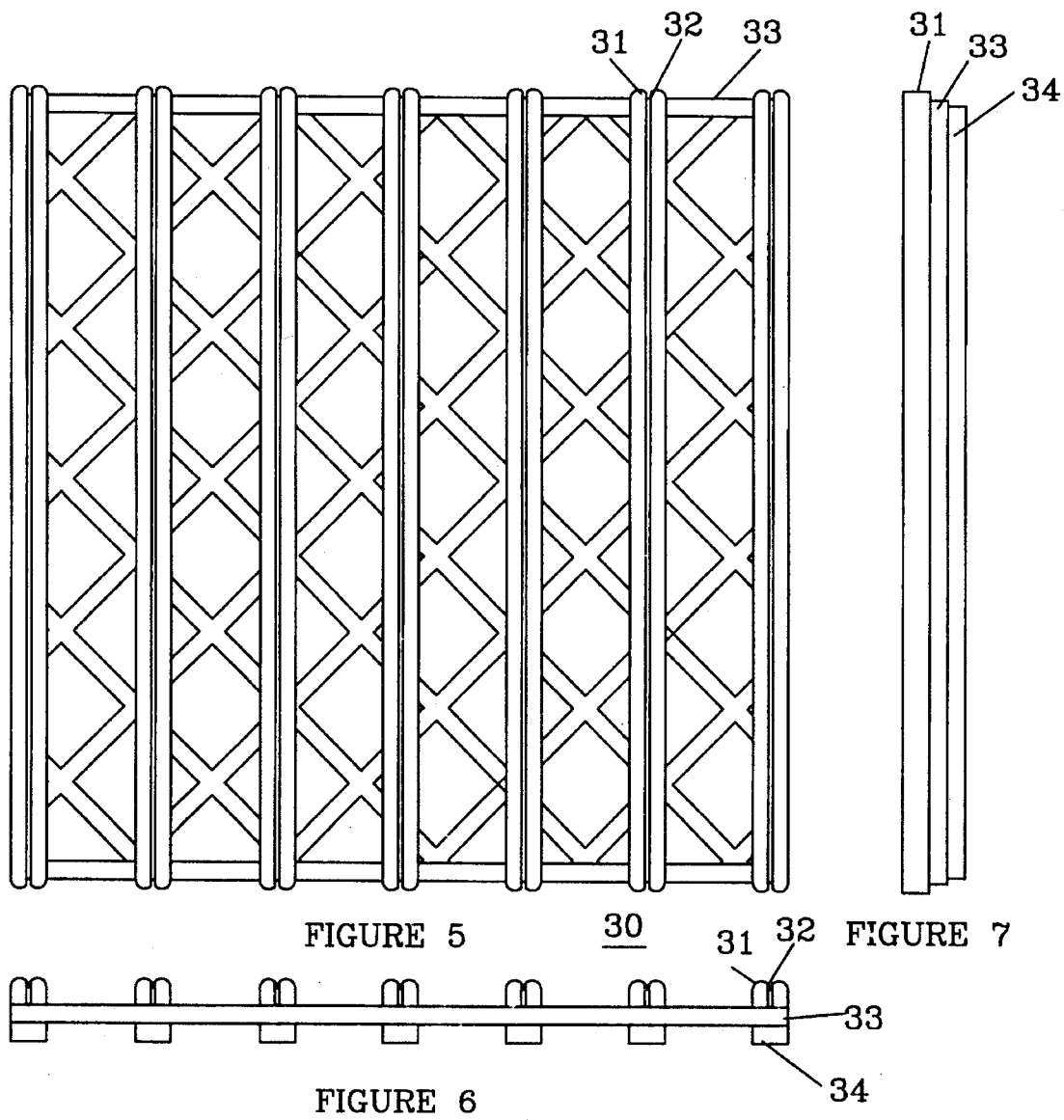

| Test 1 | PARTICLE SIZE (MICRONS) | | | | |
|---|---|---|---|---|---|
| Test Sample | 5 to 15 | 15 to 25 | 25 to 50 | 50 to 100 | Over 100 |
| Datum (NAS.1638) | 8000 | 1425 | 253 | 45 | 8 |
| Original Fluid | 47563 | 6947 | 1986 | 337 | 36 |
| Pass 1 | 2111 | 251 | 93 | 18 | 2 |
| Pass 2 | 723 | 74 | 24 | 10 | 3 |
| Pass 3 | 564 | 131 | 18 | 3 | 0 |
| Pass 4 | 466 | 40 | 16 | 3 | 0 |

FIGURE 10 liquid to be filtered from a tank or reservoir (not illustrated), the fluid enters the pump at the arrow labeled "IN". The pumped fluid first flows, as indicated by the arrows, to a water separator which includes a filter cartridge 51 through which the fluid to be filtered flows, separating it from any water in the fluid. An air bleed valve 52 is on the top of water separator 50, and a water drain valve 53 is on the bottom of water separator 50. The fluid then flows out of water separator 50 into the electrostatic filter 54. After being filtered, the fluid then flows as indicated by the "Out" arrow and is returned to a container, or may be recycled through the system for additional filtering.

The system is powered by power from an A.C. input line. The A.C. voltage powers pump 49 and a high voltage power supply 56. Switch 57 is used to turn the system ON or OFF. High voltage power supply 56 provides the high voltage source in the range of 1000 to 20,000 volts, for inputs at terminal 22 of electrostatic filter 21.

The fluid may be optionally prefiltered using a mechanical filter to remove large particle contaminants prior to using the filter of the present invention.

As the fluid flows through the filter assembly, the particulate matter will be attracted to the eclectically charged filter foam elements between the oppositely charged plates. The particles will adhere to the foam and plates as the fluid passes through the electrostatic filter.

FIG. 10 shows the efficiency of the filter of the present invention, as compared with a standard specification. This specification NAS 1638 shows the number of particles allowable for each series of particle sizes. For example, the NAS 1638 standard allows up to 8000 particles of sizes between 5 and 15 microns per 100 milliliters of fluid. In the test sample, which was 100 ml of an fluid, the particle count is shown for the five ranges of particle sizes. This is labeled as "Original Fluid". Hydraulic fluid was filtered in four passes. The particle count for each of the five ranges of particle sizes is shown for each of the four passes of the fluid through the filter. It should be noted, for example, in the 5 to 15 micron particle range, the original fluid contained 47,563 particles. The particle count was reduced to 2,111, 723, 564 and 466 in each of the four passes through the filter. The particle count in each of the five particle ranges was below the NAS 1638 specification after Pass 1, and after each subsequent filter pass. This shows the technical advance of the present invention.

What is claimed:

1. A filter for removing particles from fluids, comprising:

a housing having first and second ends;

a plurality of plates, adapted to be charged, parallel to each other and extending from said first to said second end of said housing;

a pair of holder/spacers for holding said plates, each holder spacer comprising a mesh of an insulating material with a plurality of parallel guide tracks for holding a plurality of parallel plates, and each guide track is adjacent to a conductive strip which is in electrical contact with a plate when the plate is in a guide track;

a plurality of filter elements, one each placed between adjacent plates;

a first fluid inlet in said first end of said housing, and a fluid outlet in said second end of said housing for flowing a fluid through the filter; and two electrical terminals on one of said first or second ends for providing a positive charge to alternate ones of said plates, and a negative charge to different alternate ones of said plates.

2. The filter according to claim 1, including a plurality of contacts in said housing, a first plurality of contacts connected to a first one of said two electrical terminals, and a second plurality of said contacts connected to a second one of said two electrical terminals whereby said conductive strips connect said plates to different ones of said two electrical terminals through said plurality of contacts.

3. The filter according to claim 1, wherein a pair of said holder/spacers, said plates and said filter elements form a cartridge that is removable from said housing as a single unit.

4. The filter according to claim 1, wherein said charge plates are arranged in said housing such that fluid flowing through said filter flows through said filter elements parallel to said charge plates.

5. A filter for removing particles from fluids, comprising:

a housing having first and second ends;

a plurality of plates, adapted to be charged, parallel to each other and extending from said first to said second end of said housing;

a pair of holder/spacers for holding said plates, each holder spacer comprising a mesh of an insulating material with a plurality of parallel guide tracks for holding a plurality of parallel plates, and each guide track is adjacent to a conductive strip which is in electrical contact with a plate when the plate is in a guide track;

a plurality of filter elements, one each placed between adjacent plates;

a first fluid inlet in said first end of said housing, and a fluid outlet in said second end of said housing for flowing a fluid through the filter elements parallel to said plates; and two electrical terminals on one of said first or second ends for providing a positive charge to alternate ones of said plates, and a negative charge to different alternate ones of said plates.

6. The filter according to claim 5, including a plurality of contacts in said housing, a first plurality of contacts connected to a first one of said two electrical terminals, and a second plurality of said contacts connected to a second one of said two electrical terminals whereby said conductive strips connect said plates to different ones of said two electrical terminals through said plurality of contacts.

7. The filter according to claim 5, wherein a pair of said holder/spacers, said plates and said filter elements form a cartridge that is removable from said housing as a single unit.

8. A system for removing particulate material from a fluid, comprising:

an electrostatic filter including a housing enclosing a plurality of parallel filter elements and parallel charge plates;

a pair of holder/spacers for holding said plates, each holder spacer comprising a mesh of an insulating material with a plurality of parallel guide tracks for holding a plurality of parallel plates, and each guide track is adjacent to a conductive strip which is in 5,571,399

ELECTROSTATIC FLUID FILTER AND SYSTEM

FIELD OF THE INVENTION

This invention relates to fluid filters, and more particularly to an electrostatic filter for removing micron and sub-micron size particles from fluids.

BACKGROUND OF THE INVENTION

The filtering of fluids has been done by both mechanical and electrostatic methods. In mechanical filtering, it is difficult to filter out particles having dimensions of less than 5 to 10 microns because of the small size of the particles.

Electrostatic filtering has been accomplished as defined in U.S. Pat. No. 4,594,138, issued Jun. 10, 1986. The filter described in this patent filters the fluid through a mechanical filter media, and also passing the fluid through perforated electrodes which are oppositely polarized by positive and negative charges. Because of the mechanical structure of the filter apparatus, it is not practical to change out and/or clean the mechanical filter media.

SUMMARY OF THE INVENTION

The invention is to an electrostatic fluid filter that includes a housing, a removable array of filter elements and alternately oppositely electrically charged plates positioned parallel to the fluid flow. The charged plates are mounted between spacers in which the charged plates alternately mounted in slots that are in electrical contact with either a positive or negative electrical terminal. The fluid inlet and outlet are on opposite ends of the housing such that the fluid to be filtered flows along the length of a plurality of mechanical filtering media and parallel to and in between the alternately charged plates.

The technical advance represented by the invention, as well as the objects thereof, will become apparent from the following description of a preferred embodiment of the invention when considered in conjunction with the accompanying drawings, and the novel features set forth in the appended claims.

BRIEF DESCRIPTION OF THE DRAWINGS

FIG. 2 is a front view of the filter housing;

FIG. 3 is a bottom view of the filter housing;

FIG. 4 is a side view of the filter housing;

FIG. 5 is aside view of a contact grid and electrostatic plate holder;

FIG. 6 is an edge view of the contact grid and electrostatic plate holder;

FIG. 7 is another edge view of the contact grid and electrostatic plate holder;

FIG. 10 shows test samples of fluids after filtering.

DESCRIPTION OF A PREFERRED EMBODIMENT

Figure 1:
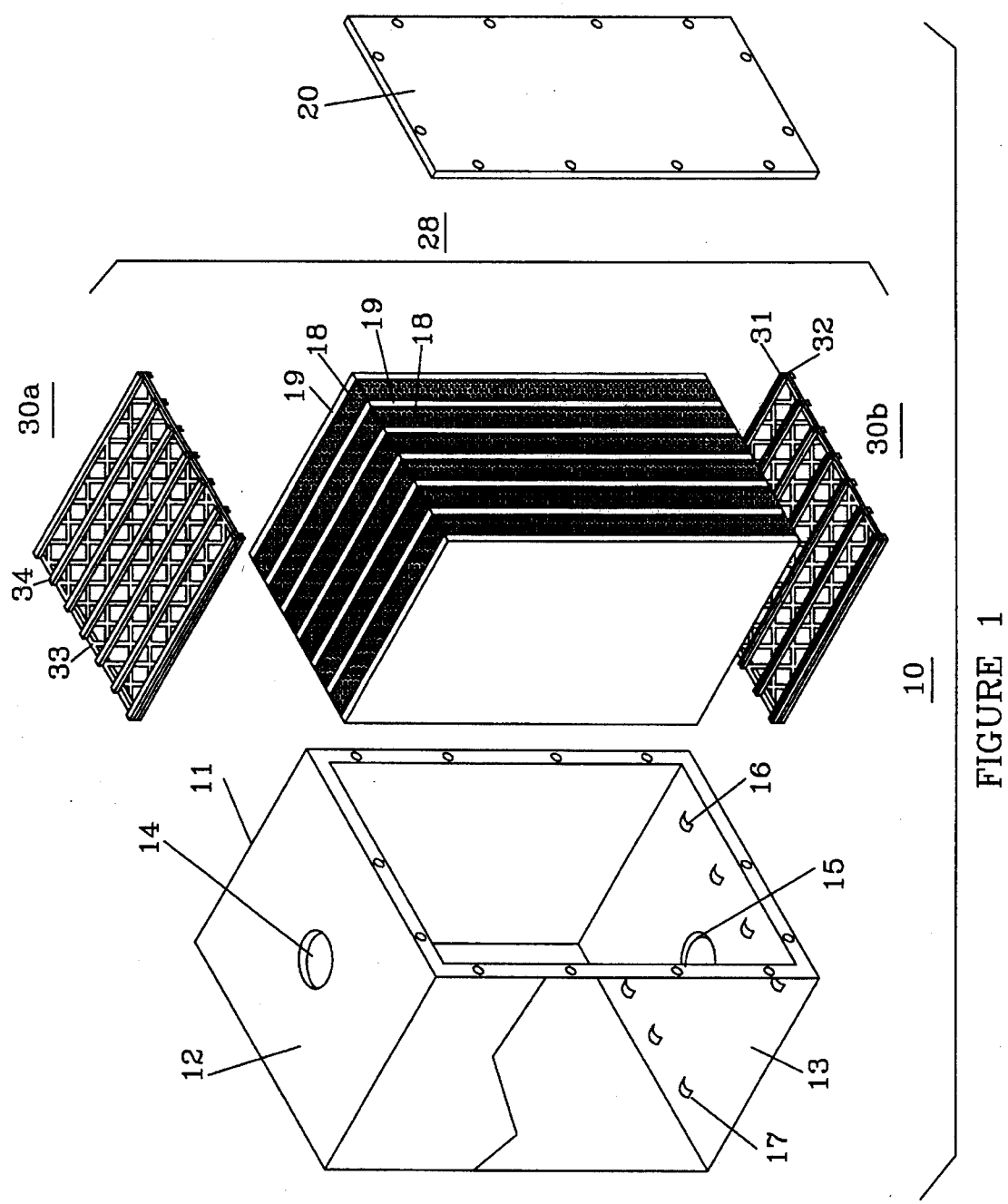
FIG. 1 is an exploded view of the filter of the present invention.

FIG. 1 shows an exploded view of the components of the fluid filter 10 of the present invention. Housing 11 has top 12 and bottom 13 sides. Top side 12 has an opening 14 which serves as the fluid outlet for the filter. Bottom side 13 has opening 15 which serves as the fluid inlet for the filter. There are two rows of electrical contacts on bottom side 13. A first row includes contacts 16 and a second row includes contacts 17. Contacts 16 and 17 are spaced so that each contact makes electrical contact with alternate charge plates 19. Charge plates 19 are spaced apart with filter elements 18 in between the plates. A charge plate filter element assembly 28, made up of a combination of charge plates 19, filter elements 18, and two holder/spacers 30a and 30b is placed inside of housing 11. A cover 20 encloses housing 11 after the assembly 28 is placed housing 11. Assembly 28 is placed between two holder/spacers 30 (FIGS. 5–7) described below making assembly 29 which is placed inside of housing 11.

FIGS. 2, 3 and 4 are front view, bottom and side views of housing 11. In the front view, the two rows of contacts 16 and 17 are shown. The contacts 16 and 17 alternate so that alternate charges, positive and negative may be placed on the charged plates 19. The two rows of contact are connected to positive and negative terminals as shown in FIG. 3. Positive terminal 21 on strip 23 provides the positive charge placed on contacts 16, and negative terminal 22, on strip 24 provides the negative charge to contacts 17. Fluid inlet 15 is shown on the bottom side in FIG. 3.

In the side view shown in FIG. 4, it may be observed that the positive terminal 21 on strip 23 is located on the front side of housing 11 and negative terminal 22 on strip 24 is located at the back of housing 11.

FIGS. 5, 6 and 7 are front, edge and side views, respectively, of holder/spacer 30. Two holder/spacers 30 are used in conjunction with charge plate 19 and filter elements 18 to form the filter cartridge 28. Holder/spacer 30 includes a plurality of guides 31 with tracks 32 into which the charge plates are placed. Holder/spacer 30 has a non-conductive grid 33 upon which the guides 31 are placed. There is one guide 31 for each charge plate 19 that is to be used in the filter cartridge. Beneath each guide 31 is a conductive strip 34 which is electrically connected to a charge plate 19 when a charge plate 19 is placed in a track 32. When a cartridge is assembled with the charge plates 19 and filter elements 18 and a holder/spacer on two sides, and the cartridge is placed in housing 11, each of conductive strips 34, on holder/spacer on the bottom of the cartridge contacts one of contacts 16 or 17 in the bottom of housing 11.

Figure 8A:
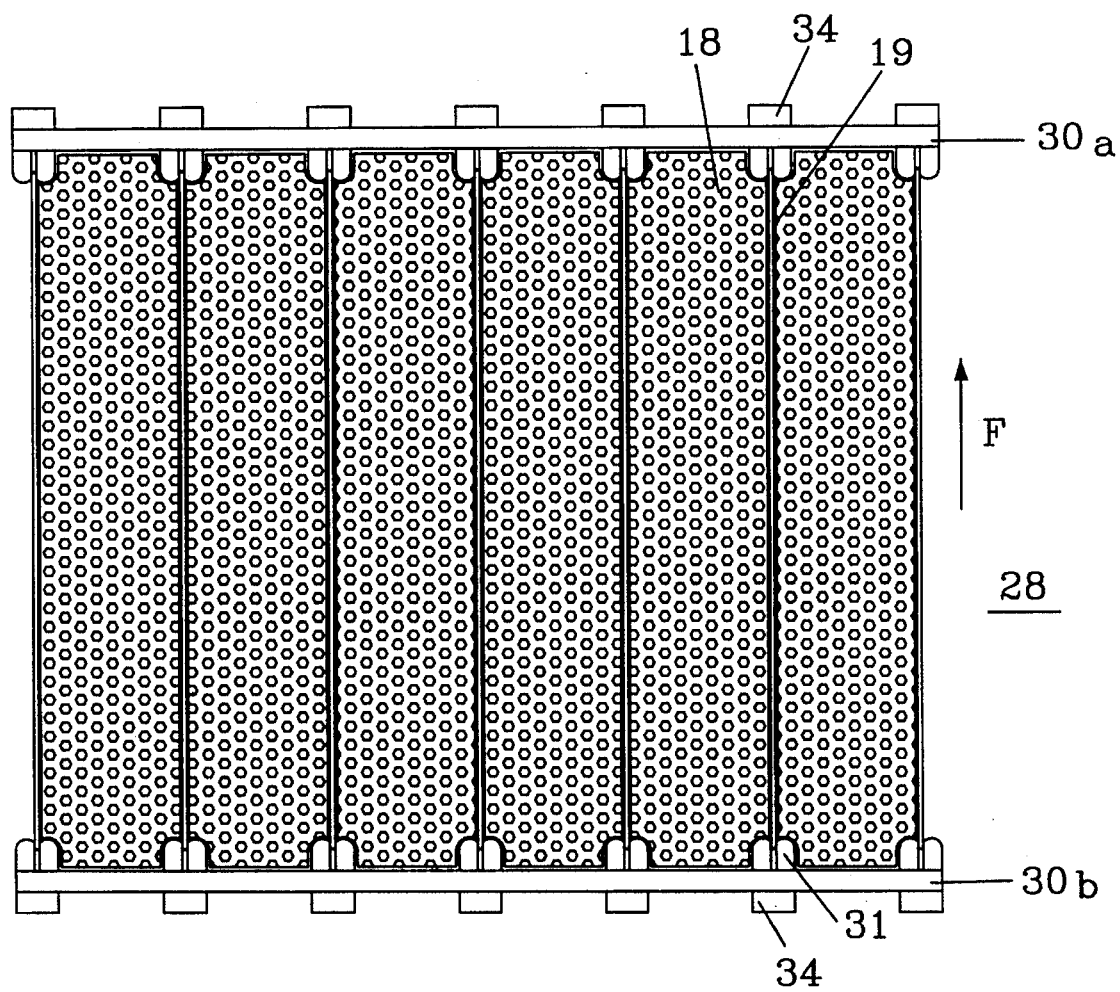
FIG. 8a shows two contact grid and electrostatic plate holders with the electrostatic plates and filter units.

FIG. 8a shows an assembled filter cartridge 28 with a holder/spacer 30a and 30b on the top and bottom, and the charge plate 19-filter element 18 assembly. Each charge plate 19 is in a track 32 in a guide 31. Conductive strips 34 are on both the top and bottom of cartridge, but only the bottom one makes contact with the contacts 16 and 17 in housing 11. With contacts 34 on both top and bottom holder/spacer 30, the cartridge can be placed in housing 11 with either end up, or down. Since cartridge 29 simply is placed in housing 11 and enclosed with cover 20. It is only necessary to remove cover 20 to remove filter cartridge 29 to clean or replace the filter elements 18. When cartridge element is in housing 11, the fluid flow through cartridge 29 is as shown by arrow F.

Figure 8B:
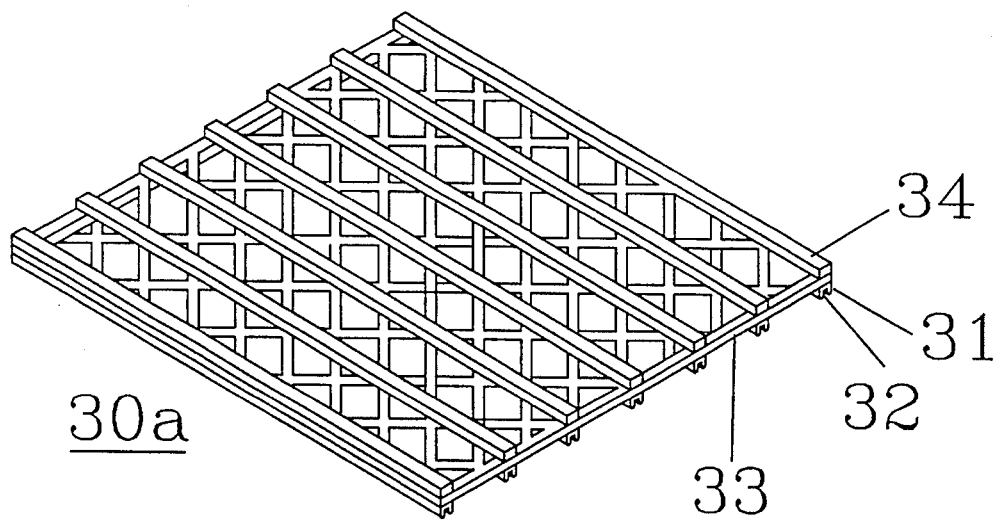
FIGS. 8b and 8c are isometric illustrations of the top and bottom space/holders.
Figure 8C:
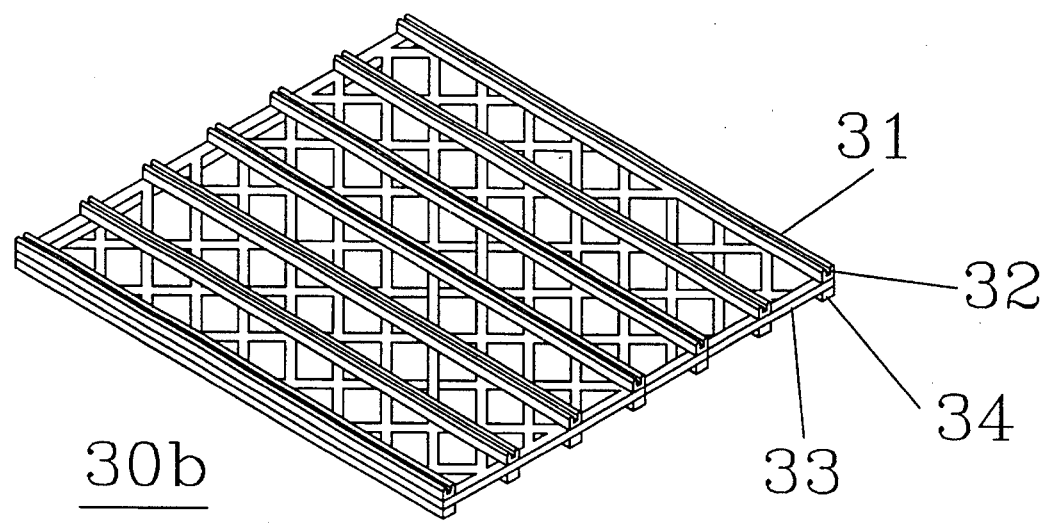

FIGS. 8b and 8c are isometric illustrations of the top and bottom space/holders 30a and 30b.

Figure 9:
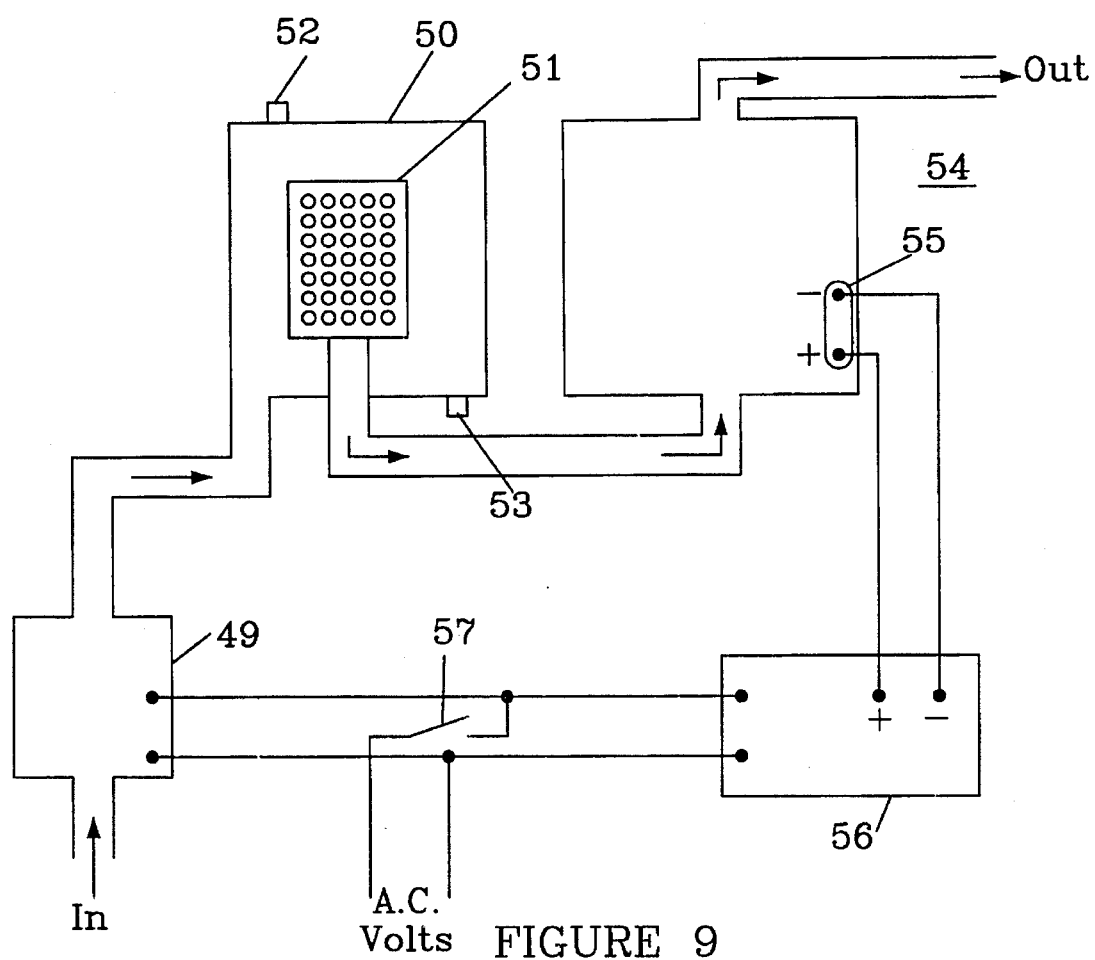
FIG. 9 is a diagram of the filter system.

FIG. 9 shows a filter system which is used in conjunction with the filter of the present invention. A pump 49 pumps electrical contact with a plate when the plate is in a guide track;

a fluid inlet and fluid outlet in said housing;

a pump for flowing a fluid through said filter via said inlet and outlet, parallel to said charge plates; and a voltage source for providing alternate positive and negative electrical changes on alternate ones of said charge plate.

9. The system according to claim 8, including a water separator through which the fluid is passed prior to flowing through said electrostatic filter.

10. The system according to claim 9, including a recirculation system to permit multiple passes of said fluid through said electrostatic filter.

* * * * *